UNITED STATES PATENT OFFICE 2,095,468

MONOAZODYESTUFFS

Richard Fleischhauer, Frankfort-on-the-Main-Fechenheim, and Carl Theo Schultis, Bergen, near Frankfort-on-the-Main, Germany, assignors to General Aniline Works, Inc., New York, N. Y., a corporation of Delaware No Drawing. Application June 6, 1936, Serial No. 83,956. In Germany August 2, 1935

4 Claims. (Cl. 260—92)

The present invention relates to valuable new monoazo dyestuffs, more particularly to those of the general formula:

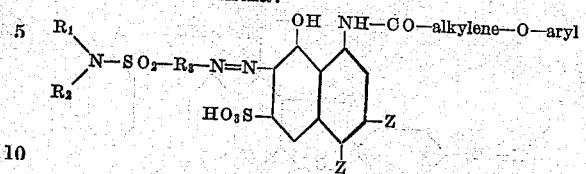

wherein $R_1$ and $R_2$ stand for a member of the group consisting of aliphatic, cycloaliphatic, phenyl, naphthyl and benzyl radicles, $R_3$ stands for a radicle of the benzene series, one of the Z's stands for hydrogen and the other one for a sulfonic acid group, and aryl means a member of the group consisting of the radicles of the benzene and naphthalene series. The new dyestuffs are obtained by combining the diazo compounds of aromatic amines of the following formula:

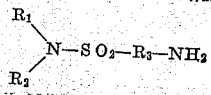

(wherein $R_1$ and $R_2$ have the above said signification) with acylated derivatives of peri-amino-naphthol-disulfonic acids containing the radical of an aryloxy fatty acid.

The present new dyestuffs dye wool and silk very bright red shades, fast to fulling, light, sea-water and perspiration.

The diazo components used for the present process may be obtained for example by condensing the corresponding secondary amines with a nitrobenzene-sulfochloride which may contain further substituents in its benzene nucleus, and by reducing the condensation products obtained.

In order to further illustrate our invention the following examples are given. However, we wish it to be understood that our invention is not limited to the particular products or reaction conditions stated therein.

Example 1

The diazo solution prepared in the usual manner by starting from 34.4 parts of 3-amino-6-methyl-benzene-1-sulfo-N-cyclohexyl-phenyl-amide is combined in the presence of sodium carbonate with the solution of 50 parts of 1-(2'-chloro-phenoxyacetylamino)-8-naphthol-4,6-disulfonic acid. The dyestuff formed of the formula:

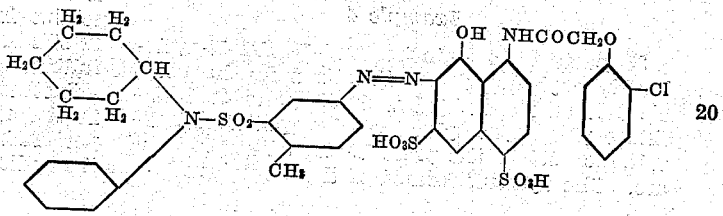

is isolated and dried. It forms a red powder, soluble in water with a red color, dyeing wool or silk bright red shades of very good fastness to fulling, light, sea-water and perspiration.

Example 2

29.8 parts of 3-amino-6-methyl-benzene-1-sulfo-di-(n-butyl)-amide are diazotized in the usual manner and combined with 50 parts of 1-(2'-chloro-phenoxyacetyl-amino)-8-naphthol-4,6-disulfonic acid in the presence of sodium carbonate. The dyestuff formed of the formula:

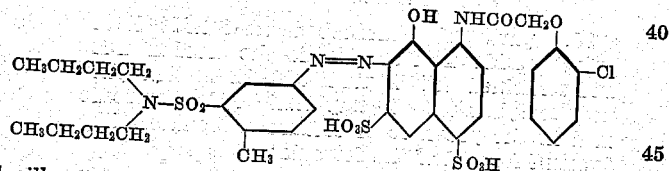

is isolated and dried.

It forms a red powder, soluble in water with a red color, dyeing wool or silk bright red shades of very good fastness to fulling, light, sea-water and perspiration.

By employing 1-(2'-chloro-phenoxyacetyl-amino)-8-naphthol-3,6-disulfonic acid a somewhat more bluish red dyeing product of equal properties is obtained.

Example 3

35.2 parts of 3-aminobenzene-1-sulfo-dibenzyl-amide are diazotized in the usual manner and combined with 50 parts of 1-(2'-chloro-phenoxy-acetylamino)-8-naphthol-4,6-disulfonic acid in the presence of sodium carbonate. The dyestuff formed of the formula:

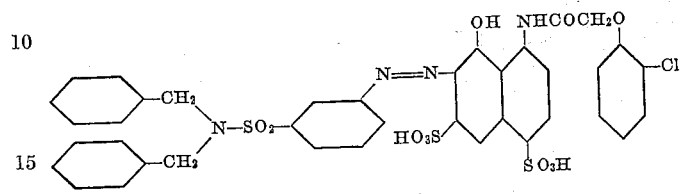

is isolated and dried. It is a red powder, soluble in water with a red color, dyeing wool or silk very clear red shades of good fastness to fulling, light, seawater and perspiration.

Example 4

33 parts of 4-aminobenzene-1-sulfo-N-cyclohexylphenyl-amide are diazotized in the usual manner and combined with 50 parts of 1-(2'-chloro-phenoxyacetylamino)-8-naphthol-4,6-disulfonic acid in the presence of sodium carbonate. The dyestuff formed of the formula:

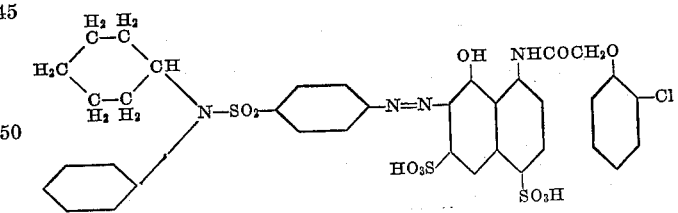

is isolated and dried. It is a red powder, soluble in water with a red color, dyeing wool or silk bright red shades of very good fastness to fulling, light, sea-water and perspiration.

Example 5

28.4 parts of 3-aminobenzene-1-sulfo-di-(n-butyl)-amide are diazotized in the usual manner and combined with 47 parts of 1-(4'-methyl-phenoxyacetylamino)-8-naphthol-4,6-disulfonic acid in the presence of sodium carbonate. The dyestuff formed of the formula:

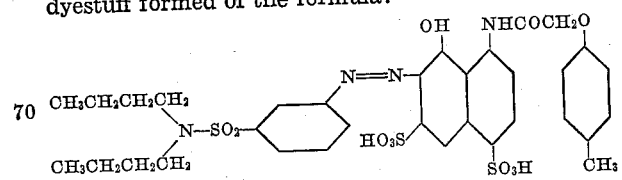

is isolated and dried. It forms a red powder, soluble in water with a red color, dyeing wool or silk red shades of very good fastness to fulling, light, sea-water and perspiration.

Example 6

35 parts of 3-amino-6-methyl-benzene-1-sulfo-N-di-cyclohexyl-amine are diazotized in the usual manner. The diazo solution obtained is allowed to run into a solution of 49 parts of 1-(2'-chloro-phenoxyacetylamino)-8-naphthol-3,6-disulfonic acid containing an excess of sodium carbonate. When the combination is complete the dyestuff formed of the formula:

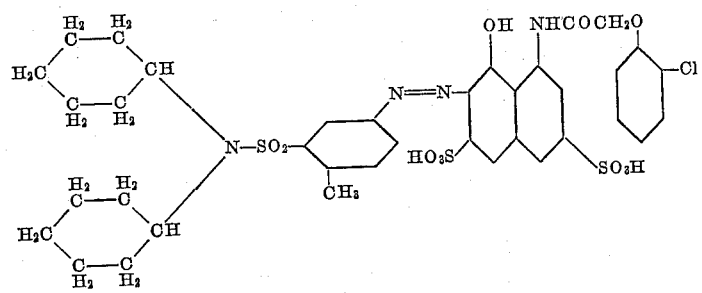

is isolated and dried. It forms a red powder, soluble in water with a red color, dyeing wool or silk bright red shades of very good fastness to fulling, light, sea-water and perspiration.

Instead of the combining components employed in the above examples there may be employed peri-aminonaphthol-disulfonic acids containing the radicals of other aryloxy fatty acids such as for example phenoxy-propionic acid, naphthoxy-acetic acids and substituted derivatives thereof.

We claim:
1. The monoazo dyestuffs of the general formula:

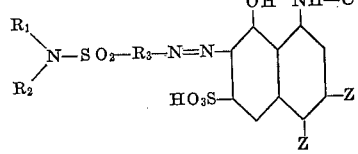

wherein $R_1$ and $R_2$ stand for a member of the group consisting of aliphatic, cycloaliphatic, phenyl, naphthyl and benzyl radicles, $R_3$ stands for a radicle of the benzene series, one of the Z's stands for hydrogen and the other one for a sulfonic acid group, and aryl means a member of the group consisting of the radicles of the benzene and naphthalene series, which dyestuffs yield on fibers, especially wool or silk, bright red shades of very good fastness to fulling, light, sea-water and perspiration.

2. The monoazo dyestuff of the formula:

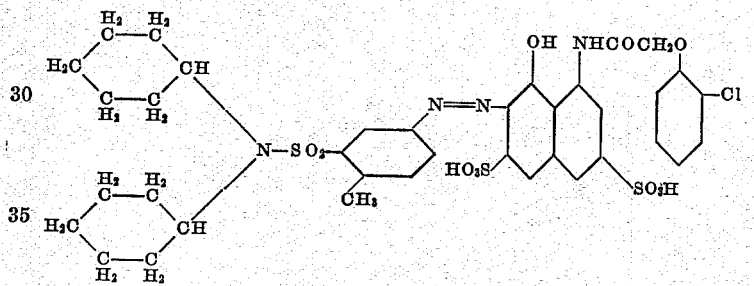

which dyestuff represents a red powder, soluble in water, dyeing wool and silk bright red shades of very good fastness to fulling, light, sea-water and perspiration.

3. The monoazo dyestuff of the formula:

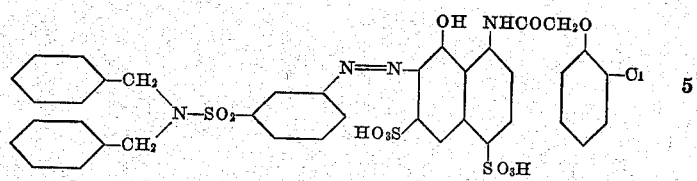

which dyestuff represents a red powder, soluble in water, dyeing wool and silk very clear red shades of good fastness to fulling, light, sea-water and perspiration.

4. The monoazo dyestuff of the formula:

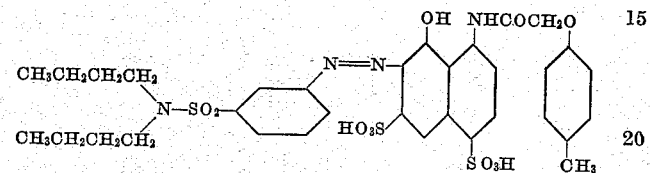

which dyestuff represents a red powder, soluble in water, dyeing wool and silk bright red shades of very good fastness to fulling, light, sea-water and perspiration.

RICHARD FLEISCHHAUER.
CARL THEO SCHULTIS.